US012505510B2

(12) United States Patent
Singh et al.

(10) Patent No.: US 12,505,510 B2
(45) Date of Patent: Dec. 23, 2025

(54) METHODS AND SYSTEMS FOR GENERATING METADATA PERTAINING TO A RAW FRAME

(71) Applicant: SAMSUNG ELECTRONICS CO., LTD., Suwon-si (KR)

(72) Inventors: Balvinder Singh, Bengaluru (IN); Raj Narayana Gadde, Bengaluru (IN); Alok Shankarlal Shukla, Bengaluru (IN); Sirish Kumar Pasupuleti, Bengaluru (IN); Narasimha Gopalakrishna Pai, Bengaluru (IN); Prajit Sivasankaran Nair, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 369 days.

(21) Appl. No.: 18/111,225

(22) Filed: Feb. 17, 2023

(65) Prior Publication Data

US 2023/0206411 A1 Jun. 29, 2023

Related U.S. Application Data

(63) Continuation of application No. PCT/KR2022/014980, filed on Oct. 5, 2022.

(30) Foreign Application Priority Data

Oct. 6, 2021 (IN) ............................. 202141045563

(51) Int. Cl.
*G06T 5/50* (2006.01)
*G06T 3/4015* (2024.01)
*G06T 9/00* (2006.01)

(52) U.S. Cl.
CPC .............. *G06T 5/50* (2013.01); *G06T 3/4015* (2013.01); *G06T 9/00* (2013.01); *G06T 2207/20084* (2013.01)

(58) Field of Classification Search
CPC ........... G06T 5/50; G06T 3/4015; G06T 9/00; G06T 9/002; G06T 2207/20084;
(Continued)

(56) References Cited

U.S. PATENT DOCUMENTS

| 7,773,127 B2 | 8/2010 | Zimmer et al. |
| 8,233,747 B2 | 7/2012 | Ali et al. |

(Continued)

OTHER PUBLICATIONS

Written Opinion (PCT/ISA/237) issued Jan. 18, 2023 from the International Searching Authority to International Application No. PCT/KR2022/014980.

(Continued)

*Primary Examiner* — Duy M Dang
(74) *Attorney, Agent, or Firm* — Sughrue Mion, PLLC (57) ABSTRACT

A method for generating metadata pertaining to a RAW frame includes selecting an input frame from a captured RAW frame, a plurality of frames obtained by processing the captured RAW frame, and a scaled RAW frame, selecting identified salient regions in an output frame, constructed from the captured RAW frame, based on errors between regions of the input frame and a corresponding reconstruction of the region of the input frame from the identified salient regions in the output frame, obtaining a plurality of reconstructed frames, reconstructed from a plurality of blocks of each salient region, corresponding to a plurality of regions of the input frame, and generating metadata for reconstructing the captured RAW frame by encoding a plurality of errors between the plurality of reconstructed frames and corresponding plurality of regions of the input (Continued)

frame, and a reconstruction technique used for reconstructing the plurality of reconstructed frames.

20 Claims, 5 Drawing Sheets

(58) Field of Classification Search
CPC ....... G06T 2207/10; G06T 2207/10004; G06T 2207/100024; H04N 19/85; H04N 23/84; H04N 9/79

See application file for complete search history.

(56) References Cited

U.S. PATENT DOCUMENTS

| | | | |
|---|---|---|---|
| 9,036,908 | B2 | 5/2015 | Greenebaum et al. |
| 10,057,591 | B2 | 8/2018 | Yuan et al. |
| 10,298,899 | B2 | 5/2019 | Fujiwara |
| 10,958,920 | B2 | 3/2021 | Su et al. |
| 2010/0271505 | A1 | 10/2010 | Zimmer et al. |
| 2011/0135151 | A1 | 6/2011 | Jang |
| 2012/0063682 | A1 | 3/2012 | Alacoque |
| 2012/0076205 | A1* | 3/2012 | Segall .................. H04N 23/843 375/E7.243 |
| 2013/0089257 | A1 | 4/2013 | Kim et al. |
| 2016/0316219 | A1 | 10/2016 | Yuan et al. |
| 2018/0189937 | A1* | 7/2018 | Bala .......................... G06T 5/50 |

OTHER PUBLICATIONS

International Search Report (PCT/ISA/210) issued Jan. 18, 2023 from the International Searching Authority to International Application No. PCT/KR2022/014980.

Nguyen, R., M. H., et al., "RAW Image Reconstruction using a Self-Contained sRGB-JPEG Image with only 64 KB Overhead", (Jun. 27, 2016), 2016 IEEE Conference on Computer Vision and Pattern Recognition (CVPR), pp. 1655-1663, 10 pages.

Punnappurath, A., et al., "Spatially Aware Metadata for Raw Reconstruction", 2021 IEEE Winter Conference on Applications of Computer Vision (WACV), (Jan. 3, 2021) pp. 218-226, 10 pages.

Delbracio, M., et al., "Mobile Computational Photography: A Tour", arXiv:2102.09000v2, (Mar. 10, 2021) pp. 1-33, 35 pages.

Communication issued on Nov. 1, 2023 by the Indian Patent Office for Indian Patent Application No. 202141045563.

Extended European Search Report dated Jul. 31, 2024, issued by the European Patent Office in European Application No. 22878879.0.

Communication dated May 20, 2025 issued by the European Patent Office in European Patent Application No. 22878879.0.

* cited by examiner

METHODS AND SYSTEMS FOR GENERATING METADATA PERTAINING TO A RAW FRAME

CROSS-REFERENCE TO RELATED APPLICATION(S)

This application is a bypass continuation of International Application No. PCT/KR2022/014980, filed on Oct. 5, 2022, and claims priority to Indian Patent Application No. 202141045563, filed on Oct. 6, 2021, in the Indian Intellectual Property Office, the disclosures of which are incorporated herein by reference in their entireties.

BACKGROUND

1. Field

The disclosure relates to image processing, and more particularly to methods and systems for reconstructing a captured RAW frame using a generated metadata of the captured RAW frame, wherein the generated metadata is embedded in an image frame constructed using the captured RAW frame.

2. Description of Related Art

Camera sensors in media capturing devices such as cameras include sensors that are configured to detect radiance (light). The radiance can be converted to electrical signals, followed by digitization to obtain RAW frames. The RAW frames undergo various non-linear operations such as demosaicing, white-balancing, color gamut mapping, and so on, to allow generation of Red Green Blue (RGB) frames, which are intelligible to a user. The camera can allow the user to perform post processing operations such as artifact (reflection, shadow, and so on) removal, enhancement (removing blur and noise, improving sharpness, and so on), compression, and so on, on the generated RGB frames.

However, the post processing may not lead to a desired effect on the RGB frames. This is because, details pertaining to the RGB frames are likely to be lost and/or distorted, or (in some cases) rendered irrecoverable, due to the performance of the non-linear operations on the RAW frames. For example, dynamic range may decrease and pixel information may get lost. It may be noted that the RAW frames contain the original undistorted radiance information which was captured by the camera sensors. Therefore, performing post processing on the RAW frames is likely to yield more favorable results for various post processing tasks, compared to the generated RGB frames. The existing media capturing devices are not likely to store the RAW frames alongside their RGB counterparts due to memory constraints. This hinders efficient post processing.

SUMMARY

Provided are methods and systems for generating metadata pertaining to a captured RAW frame and embedding the generated metadata with an image frame generated from the captured RAW frame; and reconstructing a RAW frame using the generated metadata embedded in the image frame, and the image frame, to efficiently enhance the image frame using the reconstructed RAW frame.

Further, provided is a method and system to reconstruct the RAW frame, with a minimal error with respect to the captured RAW frame, using the generated metadata of the captured RAW frame and the image frame, wherein size of the metadata depends on resolution of the sensor, and format of the generated metadata is depends on a type of sensor used to obtain radiance information to generate the captured RAW frame.

Further, provided is a method and system is to generate the metadata based on information in detected salient regions in the image frame, where the detection allows optimizing the size of the metadata as selected portions of the image frame (i.e., the salient regions) are utilized for generating the metadata.

Further, provided is a method and system to enable enhancement of the image frame (such as zoom quality, dynamic range, and so on), using the reconstructed RAW frame with minimal memory and latency requirements, irrespective of the resolution (higher or lower) of the sensor.

Further, provided is a method and system to enable offline processing of a plurality of frames (frame acquisition, frame processing, aligning the frames and fusing the frames), using a plurality of reconstructed RAW frames corresponding to the plurality of frames.

According to an aspect of the disclosure, a method for reconstructing a RAW frame includes: selecting an input frame from a captured RAW frame, a plurality of frames obtained by processing the captured RAW frame, and a scaled RAW frame; selecting at least one identified salient region in an output frame, wherein the output frame is constructed from the captured RAW frame, and the at least one identified salient region is selected based on at least one error between at least one region of the input frame and a reconstruction of the at least one region of the input frame from the at least one identified salient region of the output frame; obtaining a plurality of reconstructed frames from a plurality of blocks of the at least one identified salient region, wherein the plurality of reconstructed frames correspond to a plurality of regions of the input frame; and generating metadata for reconstructing the RAW frame by encoding at least one of a plurality of errors between the plurality of reconstructed frames and the corresponding plurality of regions of the input frame, and a reconstruction technique used for obtaining the plurality of reconstructed frames.

The plurality of frames obtained by processing the captured RAW frame includes a first frame obtained by demosaicing the captured RAW frame, a second frame obtained by performing a white-balancing on the first frame, a third frame obtained by performing a color gamut mapping on the second frame, a fourth frame obtained by scaling the first frame based on parameters of a camera sensor of the device, a fifth frame obtained by scaling the second frame based on the parameters of the camera sensor of the device, and a sixth frame obtained by scaling the third frame based on the parameters of the camera sensor of the device.

The method includes: computing a plurality of errors including a first error between the captured RAW frame and a reconstruction of the captured RAW frame from the output frame, a plurality of second errors between each of the plurality of frames and reconstructions of the corresponding plurality of frames from the output frame, and a third error between the captured RAW frame and a reconstruction of the captured RAW frame from a scaled output frame; selecting the captured RAW frame as the input frame, based on the first error being the smallest among the plurality of errors; selecting one of the plurality of frames as the input frame, based on the second error between the selected frame and a reconstruction of the selected frame from the output frame being the smallest among the plurality of second errors and the smallest among the plurality of errors; and selecting the scaled RAW frame as the input frame, based on the third error being the smallest among the plurality of errors.

The scaled RAW frame is obtained by scaling the captured RAW frame based on one or more parameters of the camera sensor of the device, wherein the one or more parameters include a camera sensor size, Color Filter Array (CFA) of the camera sensor, and a color profile of the CFA.

The method includes: identifying a plurality of salient regions in the output frame; reconstructing a plurality of regions from the plurality of salient regions in the output frame, wherein the reconstructed plurality of regions correspond to a plurality of regions in the input frame; determining a plurality of errors between each of the reconstructed plurality of regions and the corresponding plurality of regions in the input frame; and selecting the at least one identified salient region of the output frame from the plurality of salient regions in the output frame, wherein at least one error, from the plurality of errors, is greater than a predefined threshold.

The reconstruction technique used for obtaining the plurality of reconstructed frames results in obtaining minimum values for the plurality of errors, between the plurality of reconstructed frames and the corresponding plurality of regions of the input frame, compared with values of the plurality of errors obtained by reconstructing the plurality of reconstructed frames, from the plurality of blocks of the at least one identified salient region, using a plurality of reconstruction techniques.

The plurality of reconstruction techniques include at least one image processing based reconstruction technique and at least one image Convolutional Neural Network (CNN) based reconstruction technique.

The method includes: reconstructing the input frame, using the reconstruction technique, based on the output frame and the generated metadata; and generating the captured RAW frame from the reconstructed input frame, if the input frame is not the captured frame.

According to an aspect of the disclosure, a device includes a memory storing instructions, and at least one processor configured to execute the instructions to: select an input frame from a captured RAW frame, a plurality of frames obtained by processing the captured RAW frame, and a scaled RAW frame; select at least one identified salient region in an output frame, wherein the output frame is constructed from the captured RAW frame and, the at least one identified salient region is selected based on at least one error between at least one region of the input frame and a reconstruction of the at least one region of the input frame from the at least one identified salient region of the output frame; obtain a plurality of reconstructed frames from a plurality of blocks of the at least one identified salient region, wherein the plurality of reconstructed frames correspond to a plurality of regions of the input frame; and generate metadata for reconstructing the RAW frame by encoding at least one of a plurality of errors between the plurality of reconstructed frames and the corresponding plurality of regions of the input frame, and a reconstruction technique used for obtaining the plurality of reconstructed frames.

The plurality of frames obtained by processing the captured RAW frame includes a first frame obtained by demosaicing the captured RAW frame, a second frame obtained by performing a white-balancing on the first frame, a third frame obtained by performing a color gamut mapping on the second frame, a fourth frame obtained by scaling the first frame based on parameters of a camera sensor of the device, a fifth frame obtained by scaling the second frame based on the parameters of the camera sensor of the device, and a sixth frame obtained by scaling the third frame based on the parameters of the camera sensor of the device.

The operations include: computing a plurality of errors including a first error between the captured RAW frame and a reconstruction of the captured RAW frame from the output frame, a plurality of second errors between each of the plurality of frames and reconstructions of the corresponding plurality of frames from the output frame, and a third error between the captured RAW frame and a reconstruction of the captured RAW frame from a scaled output frame; selecting the captured RAW frame as the input frame, based on the first error being the smallest among the plurality of errors; selecting one of the plurality of frames as the input frame, based on the second error between the selected frame and a reconstruction of the selected frame from the output frame being the smallest among the plurality of second errors and the smallest among the plurality of errors; and selecting the scaled RAW frame, as the input frame, based on the third error being the smallest among the plurality of errors.

The processor is configured to execute instructions to obtain the scaled RAW frame by scaling the captured RAW frame based on one or more parameters of the camera sensor of the device, wherein the one or more parameters include a camera sensor size, Color Filter Array (CFA) of the camera sensor, and a color profile of the CFA.

The processor is configured to execute instructions to identify a plurality of salient regions in the output frame; reconstruct a plurality of regions from the plurality of salient regions in the output frame, wherein the reconstructed plurality of regions correspond to a plurality of regions in the input frame; determine a plurality of errors between each of the reconstructed plurality of regions and the corresponding plurality of regions in the input frame; and select the at least one identified salient region of the output frame from the plurality of salient regions in the output frame, wherein at least one error, from the plurality of errors, is greater than a predefined threshold.

The reconstruction technique used for obtaining the plurality of reconstructed frames results in obtaining minimum values for the plurality of errors, between the plurality of reconstructed frames and the corresponding plurality of regions of the input frame, compared with values of the plurality of errors obtained by reconstructing the plurality of reconstructed frames, from the plurality of blocks of the at least one identified salient region, using a plurality of reconstruction techniques.

The plurality of reconstruction techniques comprises at least one image processing based reconstruction technique and at least one image Convolutional Neural Network (CNN) based reconstruction technique.

According to an aspect of the disclosure, a non-transitory computer readable medium for storing computer readable program code or instructions for carrying out operations, when executed by a processor, for reconstructing a RAW frame, includes operations for: selecting an input frame from a captured RAW frame, a plurality of frames obtained by processing the captured RAW frame, and a scaled RAW frame; selecting at least one identified salient region in an output frame, wherein the output frame is constructed from the captured RAW frame, and the at least one identified salient region is selected based on at least one error between at least one region of the input frame and a reconstruction of the at least one region of the input frame from the at least one identified salient region of the output frame; obtaining a plurality of reconstructed frames from a plurality of blocks of the at least one identified salient region, wherein the plurality of reconstructed frames correspond to a plurality of regions of the input frame; and generating metadata for reconstructing the RAW frame by encoding at least one of a plurality of errors between the plurality of reconstructed frames and the corresponding plurality of regions of the input frame, and a reconstruction technique used for obtaining the plurality of reconstructed frames.

The non-transitory computer readable medium includes operations for: computing a plurality of errors including a first error between the captured RAW frame and a reconstruction of the captured RAW frame from the output frame, a plurality of second errors between each of the plurality of frames and reconstructions of the corresponding plurality of frames from the output frame, and a third error between the captured RAW frame and a reconstruction of the captured RAW frame from a scaled output frame; selecting the captured RAW frame as the input frame, based on the first error being the smallest among the plurality of errors; selecting one of the plurality of frames as the input frame, based on the second error between the selected frame and a reconstruction of the selected frame from the output frame being the smallest among the plurality of second errors and the smallest among the plurality of errors; and selecting the scaled RAW frame as the input frame, based on the third error being the smallest among the plurality of errors.

The non-transitory computer readable medium includes operations for: identifying a plurality of salient regions in the output frame; reconstructing a plurality of regions from the plurality of salient regions in the output frame, wherein the reconstructed plurality of regions correspond to a plurality of regions in the input frame; determining a plurality of errors between each of the reconstructed plurality of regions and the corresponding plurality of regions in the input frame; and selecting the at least one identified salient region of the output frame from the plurality of salient regions in the output frame, wherein at least one error, from the plurality of errors, is greater than a predefined threshold.

The non-transitory computer readable medium includes instructions for the reconstruction technique used for obtaining the plurality of reconstructed frames that results in obtaining minimum values for the plurality of errors, between the plurality of reconstructed frames and the corresponding plurality of regions of the input frame, compared with values of the plurality of errors obtained by reconstructing the plurality of reconstructed frames, from the plurality of blocks of the at least one identified salient region, using a plurality of reconstruction techniques.

The non-transitory computer readable medium includes operations for: reconstructing the input frame, using the reconstruction technique, based on the output frame and the generated metadata; and generating the captured RAW frame from the reconstructed input frame, if the input frame is not the captured frame.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for generating metadata pertaining to a captured RAW frame and embedding the generated metadata with an image frame generated from the captured RAW frame; and reconstructing a RAW frame using the generated metadata embedded in the image frame, and the image frame, to efficiently enhance the image frame using the reconstructed RAW frame. Reference will now be made in detail to embodiments of the disclosure, which are illustrated in the accompanying drawings, wherein like reference numerals refer to the like elements throughout.

Figure 1:
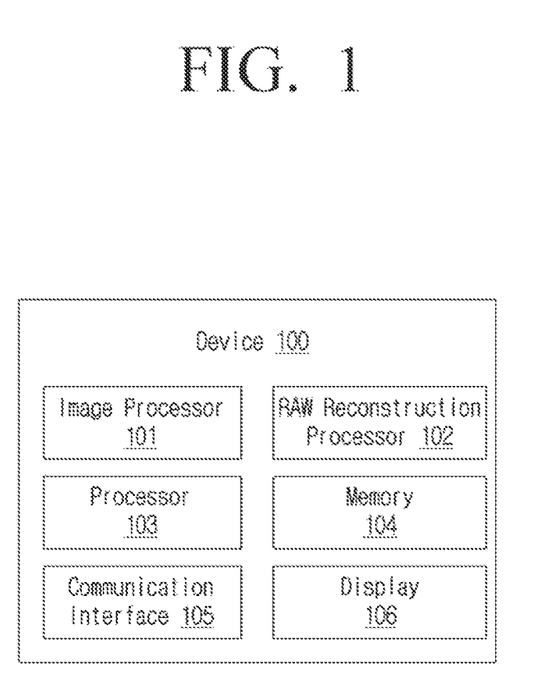
FIG. 1 is a diagram depicting a device for generating metadata pertaining to a RAW frame using an image frame, wherein the metadata can be used for reconstructing the RAW frame and can be embedded in the image frame, according to embodiments.

FIG. 1 is a diagram depicting a device 100 configured to generate metadata pertaining to a RAW frame using an image frame, wherein the metadata can be used for reconstructing the RAW frame and can be embedded in the image frame, according to embodiments. As depicted in FIG. 1, the device 100 comprises an image processor 101, a RAW reconstruction processor 102, a processor 103, a memory 104, a communication interface 105, and a display 106. In an embodiment, the image processor 101 can include a demosaicer, a white-balancing unit, a color gamut mapping unit, and an encoder. The image processor 101 can include additional units for processing image frames. In an embodiment, the RAW reconstruction processor 102 can be a neural network processor trained to reconstruct RAW frames from image frames encoded in one or more image formats. Further, the RAW reconstruction processor 102 can perform reconstructions, wherein the reconstructed output frame can be a demosaiced frame (a RAW frame subjected to demosaicing), a white-balanced frame (a RAW frame subjected to demosaicing and white-balancing), or a color gamut mapped frame (a RAW frame subjected to demosaicing, white-balancing, and color gamut mapping). In another embodiment, the RAW reconstruction processor 102 can utilize image processing based RAW reconstruction techniques for reconstructing RAW frames using image frames.

The processor 103 can obtain perform functions such as determining salient regions in image frames, comparing image frames, computing errors between image frames, segmenting an image frame into a plurality of blocks, encoding computed errors between image frames, and so on. The memory 104 can store demosaiced frames, white-balanced frames, and color gamut mapped frames, which can be obtained by the processor 103 for comparing with corresponding outputs of the RAW reconstruction processor 102. The memory 104 can temporarily store a captured RAW frame, which can be obtained by the processor 103 for comparing with a reconstructed RAW frame, obtained as an output from the RAW reconstruction processor 102. The memory 104 can store image frames generated using captured RAW frames.

FIG. 1 shows exemplary units of the device 100, but it is to be understood that other embodiments are not limited thereon. In other embodiments, the device 100 may include less or more number of units. Further, the labels or names of the units of the device 100 are used only for illustrative purpose and does not limit the scope of the invention. One or more units can be combined together to perform same or substantially similar function in the device 100.

Figure 2:
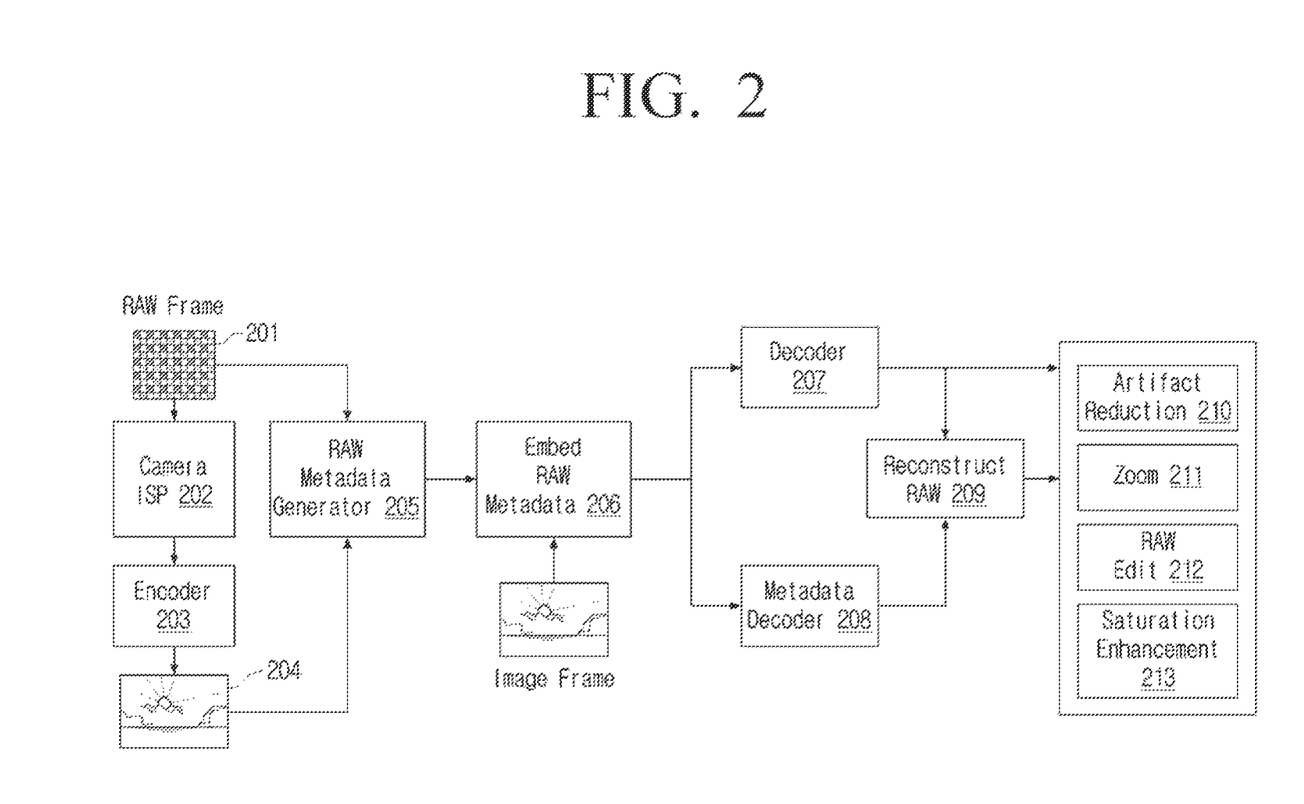
FIG. 2 is a block diagram depicting generation of metadata of a RAW frame using a RAW metadata generator and reconstruction of the RAW frame using a RAW metadata detector, according to embodiments.

FIG. 2 is a block diagram depicting generation of metadata of a RAW frame using a RAW metadata generator and reconstruction of the RAW frame using a RAW metadata detector, according to embodiments. As depicted in FIG. 2, a camera sensor (not shown) in the device 100 can generate a RAW frame 201. The pattern of pixels in the generated RAW frame 201 depends on parameters of the camera sensor of the device 100. The parameters include size of the camera sensor, Color Filter Array (CFA) of the camera sensor, a color profile of the CFA, and so on. The RAW frame 201 can be provided to a camera Image-Signal Processing (ISP) block 202. The camera ISP block 202 can perform operations on the RAW frame 201 to generate an image frame 204. In an embodiment, the operations performed on the RAW frame 201 include demosaicing, white-balancing, color gamut mapping, and so on. The processed RAW frame can be encoded by an encoder 203 to generate the image frame 204. In an example, the encoder 203 is a Joint Photographic Experts Group (JPEG) encoder. The JPEG encoder can generate JPEG images. The functionalities of the ISP block 202 and the encoder 203 can be performed by the image processor 101.

The RAW metadata generator 205 can generate RAW metadata using the RAW frame 201 and the image frame 204. The RAW metadata generator 205 will be explained in detail in FIG. 3. Once the RAW metadata is generated, the RAW frame 201 can be deleted from the device 100. The generated RAW metadata can be embedded 206 with the image frame 204. When a user of the device 100 intends to reconstruct the RAW frame 201, the RAW metadata can be extracted from the image frame 204. A decoder 207 can decode the image frame 204. A metadata decoder 208 can decode the RAW metadata. The decoded image frame and the decoded RAW metadata can be used for reconstructing 209 the RAW frame 201. The reconstructed RAW frame can be used for processing such as artifact reduction 210, zooming 211, RAW editing 212, saturation enhancement 213, and so on.

Figure 3:
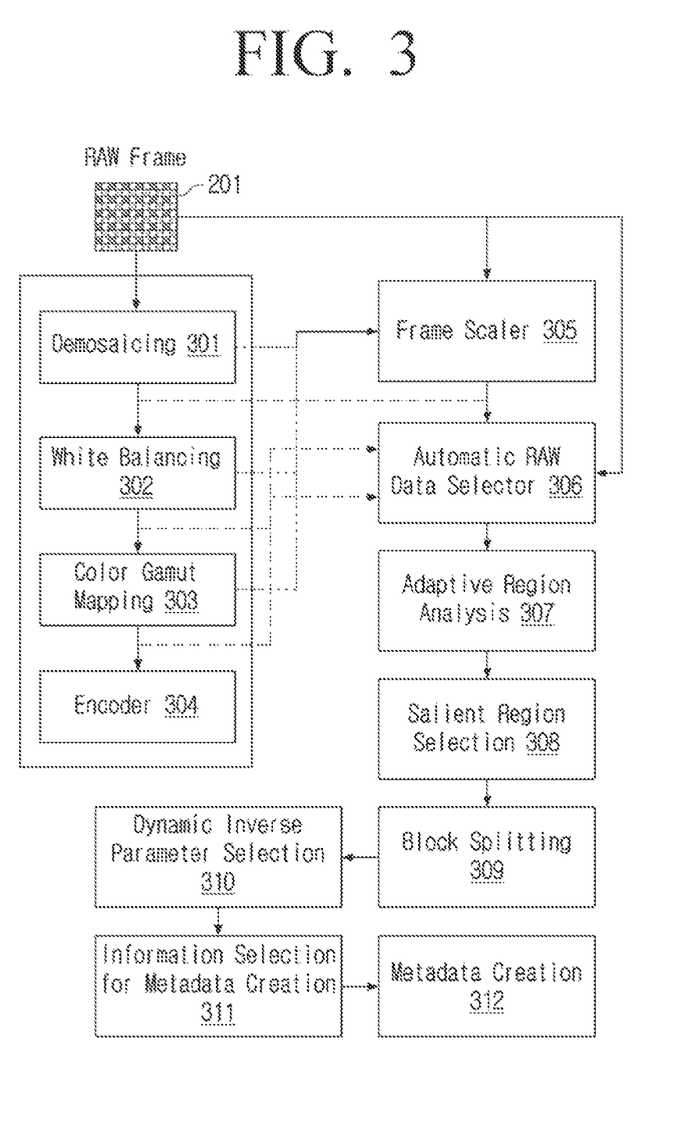
FIG. 3 is a block diagram depicting generation of metadata of a RAW frame using the RAW metadata generator, according to embodiments.

FIG. 3 is a block diagram depicting generation of metadata of a RAW frame using the RAW metadata generator 205, according to embodiments. As depicted in FIG. 3, the captured RAW frame 201 can be fed to the image processor 101 comprising a demosaicer 301, a white-balancer 302, a color gamut mapper 303, and an encoder 304. The RAW frame 201 is successively fed to the demosaicer 301, the white-balancer 302, the color gamut mapper 303, and the encoder 304. The processor 103 can obtain outputs generated at each stage, i.e., demosaiced output (obtained by demosaicing the captured RAW frame 201), white-balanced output (obtained by white-balancing and noise filtering of the demosaiced output), color gamut mapped output (obtained by color gamut mapping of the white-balanced output). The processor 103 can store the captured RAW frame 201, the demosaiced output, the white-balanced output, and the color gamut mapped output in the memory 104. The encoder 304 can encode the color gamut mapped output to obtain the image frame 204. Here onwards, the image frame 204 will be referred to as output frame. In an example, the output frame can be a JPEG image, a Bitmap image, a PNG image, and so on, based on a type of encoding employed at the encoder 304.

In an embodiment, the captured RAW frame 201 can be scaled by a frame scaler 305 based on the camera sensor parameters to obtain a scaled RAW frame. For example, if the CFA of the camera sensor is a tetra sensor, the captured RAW frame 201 can be downscaled by a factor of 2 (an N×N RAW frame can be scaled to N/2×N/2). Similarly, if the CFA of the camera sensor is a nona sensor, the captured RAW frame 201 can be downscaled by a factor of 3 (an N×N RAW frame can be scaled to N/3×N/3). The downscale factor can be obtained from the characteristics of the sensor (ex: based on CFA arrangement). In an embodiment, each of the demosaiced output, the white-balanced output, and the color gamut mapped output, can be downscaled by a factor of 2 (for tetra sensor) or downscaled by a factor of 3 (for nona sensor), to obtain a downscaled demosaiced output, a downscaled white-balanced output, and a downscaled color gamut mapped output.

An automatic RAW data selector block 306 can select an input frame from the captured RAW frame 201, the scaled RAW frame, the demosaiced output, the white-balanced output, the color gamut mapped output, the downscaled demosaiced output, the downscaled white-balanced output, and the downscaled color gamut mapped output. The processor 103 can perform the selection using inputs from the RAW reconstruction processor 102.

In an embodiment, the RAW reconstruction processor 102 can obtain the output frame from the image processor 101. The RAW reconstruction processor 102 can generate a reconstruction of the captured RAW frame 201 from the output frame. The generated reconstruction of the captured RAW frame 201 can be referred to as reconstructed RAW frame. The RAW reconstruction processor 102 can store intermediate outputs generated during the generation of the reconstructed RAW frame. For simplicity, consider that the reconstruction of the captured RAW frame 201 (to obtain the reconstructed RAW frame) involves decoding, inverse color gamut mapping, inverse white balancing and inverse demosaicing. The decoded output frame can be referred to as color gamut mapped output. The inverse color gamut mapped output can be subjected to inverse color gamut mapping to obtain an inverse white-balanced output. The inverse white-balanced output can be subjected to inverse white-balancing to obtain an inverse demosaiced output. The inverse demosaiced output can be subjected to inverse demosaicing to obtain the reconstructed RAW frame. The RAW reconstruction processor 102 can store the inverse color gamut mapped output, the inverse white-balanced output, the inverse demosaiced output, and the reconstructed RAW frame, in the memory 104.

In an embodiment, the output frame is downscaled by a factor of 2 (for tetra sensor) or is downscaled by a factor of 3 (for nona sensor). The downscaled output frame can be decoded to obtain a downscaled inverse color gamut mapped output. The inverse downscaled color gamut mapped output can be subjected to inverse color gamut mapping to obtain an inverse downscaled white-balanced output. The inverse downscaled white-balanced output can be subjected to inverse white-balancing to obtain an inverse downscaled demosaiced output. The inverse downscaled demosaiced output can be subjected to inverse demosaicing to obtain a reconstructed downscaled RAW frame. The reconstructed downscaled RAW frame can be upscaled to obtain a reconstructed scaled RAW frame. The RAW reconstruction processor 102 can store the downscaled inverse color gamut mapped output, the inverse downscaled white-balanced output, the inverse downscaled demosaiced output, and the reconstructed scaled RAW frame, in the memory 104.

In an embodiment, the processor 103 can compare the captured RAW frame with the reconstructed RAW frame to obtain a first error. The processor 103 can compare the demosaiced output with the inverse demosaiced output to obtain a second error. The processor 103 can compare the white-balanced output with the inverse white-balanced output to obtain a third error. The processor 103 can compare the color gamut mapped output with the inverse color gamut mapped output to obtain a fourth error. The processor 103 can compare the captured RAW frame with the reconstructed scaled RAW frame to obtain a fifth error. The processor 103 can compare the downscaled demosaiced output with the inverse downscaled demosaiced output to obtain a sixth error. The processor 103 can compare the downscaled white-balanced output with the inverse downscaled white-balanced output to obtain a seventh error. The processor 103 can compare the downscaled color gamut mapped output with the inverse downscaled color gamut mapped output to obtain an eighth error. The processor 103 can determine the lowest error among the eight errors.

If the first error is the lowest, the processor 103 can select the captured RAW frame 201 as the input frame. If the second error is the lowest, the processor 103 can select the demosaiced output as the input frame. If the third error is the lowest, the processor 103 can select the white-balanced output as the input frame. If the fourth error is the lowest, the processor 103 can select the color gamut mapped output as the input frame. If the fifth error is the lowest, the processor 103 can select the scaled RAW frame as the input frame. If the sixth error is the lowest, the processor 103 can select the downscaled demosaiced output as the input frame. If the seventh error is the lowest, the processor 103 can select the downscaled white-balanced output as the input frame. If the eighth error is the lowest, the processor 103 can select the downscaled color gamut mapped output as the input frame.

The errors indicate a degree of change introduced to the captured RAW frame 201 due to non-linear operations (such as demosaicing, white-balancing, color gamut mapping, scaling, and so on) performed by the image processor 101. The processor 103 may select other frames (if error is low), apart from the captured RAW frame 201, as the input frame for further processing involved in generating the metadata. This is because usage of the other frames as input frame allows generating the metadata with reduced memory requirement and reduced latency. A lower error (second error-eighth error) indicates that the performance of the non-linear operations on the captured RAW frame 201 may not prevent reconstruction of the captured RAW frame 201 without significant errors.

Further, the reconstruction of the input frame, using metadata pertaining to the input frame and the output frame, and, subsequently, reconstruction of the captured RAW frame 201 using the reconstructed input frame, can be performed with reduced memory requirement at a reduced latency; compared to the memory requirement and latency involved in reconstructing the captured RAW frame 201 using the metadata pertaining to the captured RAW frame 201.

An adaptive region analysis block 307 can analyze the output frame to detect salient regions in the output frame. The processor 103 can identify one or more salient regions in the output frame. The processor 103 identifies the one or more salient regions in the output frame in order to minimize the size of the metadata to be generated. Further, considering only the identified salient regions for generating the metadata of the input frame allows reconstructing the captured RAW frame 201, using a reconstructed input frame, with a minimum error (compared with the captured RAW frame 201) or an error that is within a tolerable limit. The RAW reconstruction processor 102 can reconstruct one or more portions of the input frame from the one or more salient regions. The processor 103 can compare the reconstructed one or more portions of the input frame and corresponding one or more portions of the input frame. If processor 103 detects a plurality of salient regions, a plurality of reconstructed portions of the input frame is obtained.

The processor 103 can configure a first threshold; wherein if an error between a portion of the reconstructed input frame and a corresponding portion of the input frame is greater than the first threshold, the portion of the reconstructed input frame corresponding to an identified salient region (from which the portion of the input frame is reconstructed) is selected for further processing. A salient region selection block 308 selects one or more identified salient regions based on the first threshold criterion. In an embodiment, the first threshold can be configured based on an acceptable size of the metadata. If the acceptable size of the metadata is higher, then the first threshold is decreased. This allows selection of salient region(s), wherein error(s) between portion(s) of the reconstructed input frame (reconstructed from the salient region(s)) and corresponding portion(s) of the input frame is lower. On the other hand, if the acceptable size of the metadata is lower, then the first threshold is increased. This allows selection of salient region(s), wherein error(s) between portion(s) of the reconstructed input frame (reconstructed from the salient region(s)) and corresponding portion(s) of the input frame is higher.

Each selected salient region is split into a plurality of blocks at a block splitting block 309. The processor 103 segments each of the plurality of salient regions into blocks. The processor 103 can send the blocks of each of the plurality of salient regions to the RAW reconstruction processor 102. The RAW reconstruction processor 102 can reconstruct portions of the input frame from the blocks of each of the plurality of salient regions. The processor 103 can determine errors by comparing the reconstructed portions of the input frame with corresponding portions of the input frame. In an embodiment, the RAW reconstruction processor 102 can reconstruct each portion of the input frame using a plurality of reconstruction techniques. The plurality of reconstruction techniques include neural network based techniques and conventional RAW reconstruction techniques. For each block of each of the plurality of salient regions, the processor 103 can compare errors, obtained by reconstructing a portion of the input frame from a block using a plurality of reconstruction techniques, between the reconstructed portion of the input frame and the corresponding portion of the input frame.

For example, consider that the processor 103 has selected three salient regions. A first salient region is segmented into three blocks, a second salient region is segmented into four blocks, and a third salient region is segmented into six blocks. Therefore, there will be thirteen blocks. The RAW reconstruction processor 102 can reconstruct thirteen portions of the input frame from the thirteen blocks. Consider, for example, the RAW reconstruction processor 102 reconstructs ten copies of each of the thirteen portions using ten reconstruction techniques. A first portion is obtained by reconstructing ten copies of the first portion from a first block. Each of the ten copies of the first portion can be compared with a corresponding portion of the input frame. The copy resulting in a minimum error can be selected as the first portion. The remaining twelve portions can be similarly obtained.

In an embodiment, the processor 103 can determine, for each of the thirteen reconstructed portions of the input frame, the reconstruction technique (from the ten reconstruction techniques) that resulted in minimum error between the selected copy of a portion and a corresponding portion of the input frame. The reconstruction techniques used for reconstructing the portions of the input frame from the blocks of each of the plurality of selected salient regions is determined as inverse parameters at a dynamic inverse parameter selection block 310.

The processor 103 can determine whether errors between the portions of the input frame, reconstructed from the blocks of each of the plurality of selected salient regions, and the corresponding portions of the input frame are greater than a second threshold. The processor 103 can select reconstructed portions of the input frame for further processing on determining that errors between the reconstructed portions of the input frame and the corresponding portions of the input frame are greater than the second threshold. The portions of the input frame, reconstructed from the blocks of each of the plurality of salient regions, can be selected at an information selection for metadata creation block 311.

The segmentation of each of the selected plurality of the salient regions allows reducing the size of generated metadata of the input frame. This is because an error between a portion of the input frame, reconstructed from a salient region of the input frame, and the corresponding portion of the input frame, is likely to be higher compared to an error between a portion of the input frame, reconstructed from a block of the salient region of the input frame, and the corresponding portion of the input frame. If the error is less, the processor 103 may not select the reconstructed portions of the input frame for further processing (as the error is likely to be less than the second threshold).

The processor 103 generates metadata of the input frame comprising encoded errors between the selected (at block 311) reconstructed portions of the input frame and the corresponding portions of the input frame, and the reconstruction techniques (obtained at block 310) used for obtaining the selected reconstructed portions of the input frame. The metadata is generated at a metadata generator block 312. In an embodiment, the metadata can be embedded with the output frame. The processor 103 may delete the captured RAW frame 201 after generating the metadata of the input frame. If the input frame is not the captured RAW frame 201, the RAW reconstruction processor 102 can reconstruct the captured RAW frame 201 from the reconstructed input frame.

The embodiments disclosed herein can be implemented through at least one software program running on at least one hardware device and performing network management functions to control the network elements. The network elements shown in FIGS. 2 and 3 include blocks which can be at least one of a hardware device, or a combination of hardware device and software module.

Figure 4:
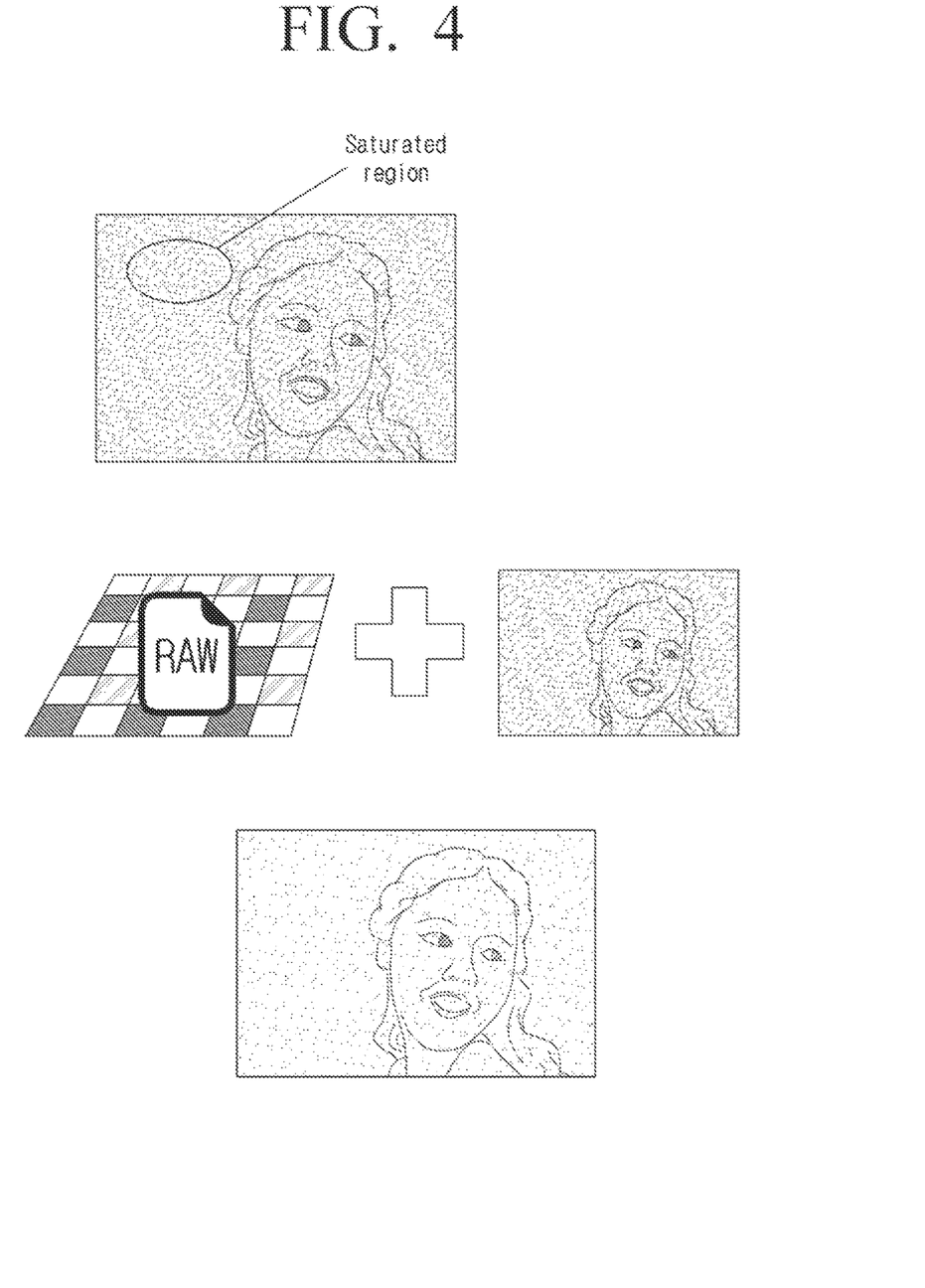
FIG. 4 depicts an example scenario of detection and enhancement of saturated regions in an image frame, and dynamic range enhancement of the image frame, using a reconstructed RAW frame, according to embodiments.

FIG. 4 depicts an example scenario of detection and enhancement of saturated regions in an image frame, and dynamic range enhancement of the image frame, using a reconstructed RAW frame, according to embodiments. The reconstructed RAW frame is obtained using the image frame and metadata pertaining to a RAW frame, from which the image frame is generated. As depicted in FIG. 4, the image frame includes a saturated region. The metadata pertaining to the RAW frame is embedded with the image frame. The embodiments include extracting the metadata using the image frame. The metadata pertaining to the RAW frame and the image frame can be used for obtaining the reconstructed RAW frame, which is used for achieving better saturation control in the image frame and enhancing the dynamic range of the image frame.

The embodiments allow improving the dynamic range of the image frame using the reconstructed RAW frame by intelligent scene saturation analysis. The reconstructed RAW frame is obtained using the image frame and metadata pertaining to a RAW frame, from which the image frame is generated. The embodiments further allow improving the dynamic range of the image frame in a single-take capture using metadata of the RAW frame encapsulated with the image frame.

The embodiments allow improving the quality of a zoomed version of an image frame (RGB frame) using a RAW frame that has been reconstructed using metadata of a RAW frame, from which the image frame is generated. The metadata pertaining to RAW frames can be embedded with RGB frames generated from the RAW frames. The zoomed image frame can be enhanced in the background processing using the RAW image, which can be reconstructed from the metadata, without effecting capture time.

If a plurality of frames are captured (in background) when a user intends to capture a frame, the embodiments include generating metadata pertaining to RAW frames corresponding to each of the plurality of frames. The embodiments include performing offline processing of the plurality of frames to generate a single desired frame. The offline processing is performed by reconstructing the RAW frames using the metadata pertaining to the RAW frames and utilizing the reconstructed RAW frames for performing operations such as acquisition of the plurality of frames, processing the plurality of frames, aligning the plurality of frames, and fusing the plurality of frames for generating the single desired frame.

The embodiments allow volumetric capture using multiple high resolution camera sensors for faster processing. The embodiments facilitate reduce frame capture time and data transfer time for high resolution camera sensors (such as 48 Mega Pixel (MP), 64 MP, 108 MP, 600 MP, and so on) with improved quality. Volumetric capture necessitates a tradeoff between number of cameras and camera sensor resolution. An increase in the number of cameras and camera sensor resolution allows capturing details, but results in slower processing and increase in capture time.

Figure 5:
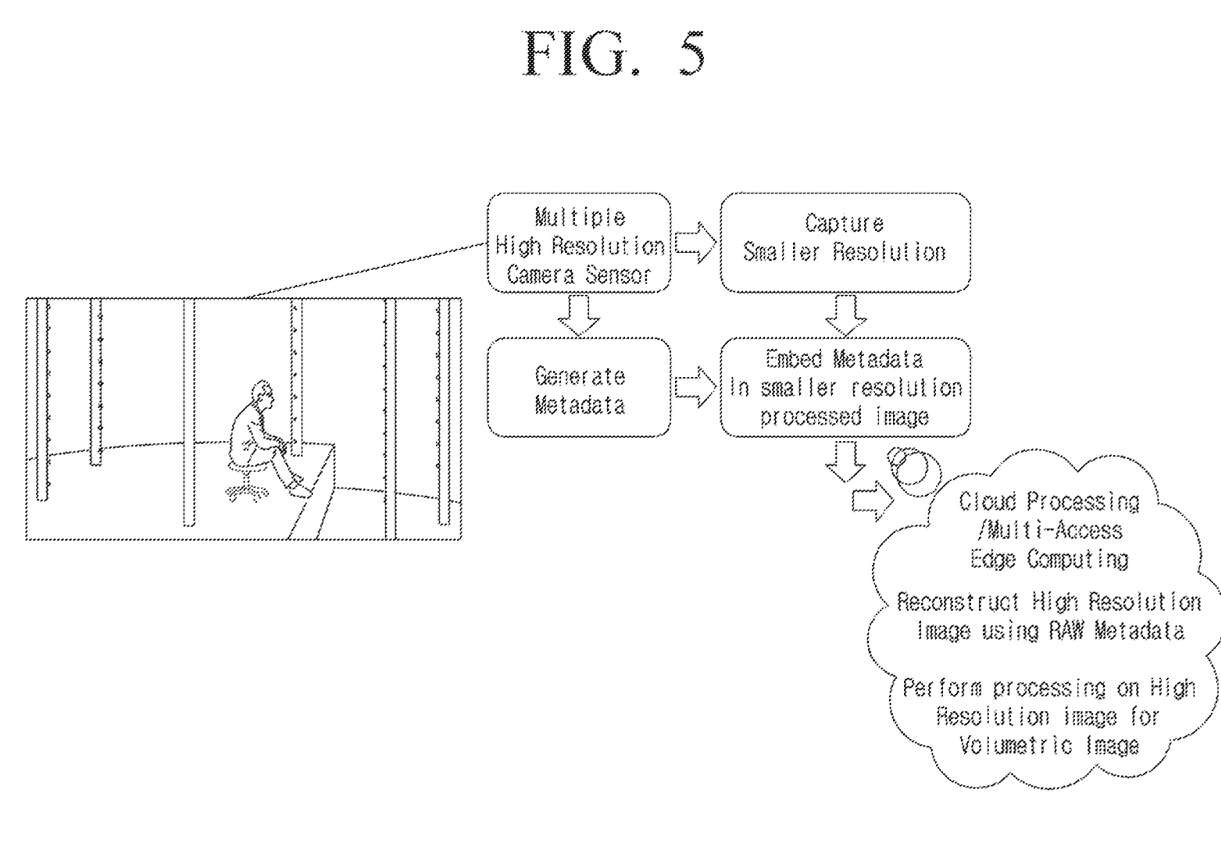
FIG. 5 depicts an example scenario of faster volumetric capture, and processing on a high resolution image frame using a reconstructed RAW frame, according to embodiments.

FIG. 5 depicts an example scenario of faster volumetric capture and processing on a high resolution image frame using a reconstructed RAW frame, according to embodiments. The reconstructed RAW frame is obtained using metadata pertaining to a RAW frame, from which the high resolution image frame is generated. The metadata pertaining to the RAW frame is embedded with the image frame. The embodiments include extracting the metadata using the image frame. The embodiments allow utilization of metadata pertaining to the RAW frame along with Multi-access Edge Computing (MEC) environment, to enable high resolution captures from a large number of cameras within an optimal capture time. The embodiments allow generating metadata of optimal size, pertaining to high resolution sensor RAW frames, which can be transferred to a MEC environment with reduced latency. The MEC environment can provide necessary computing power to reconstruct the high resolution sensor RAW frames from the metadata. The reconstructed RAW frames can be processed to create high quality volumetric images in the MEC.

The embodiments disclosed herein describe methods and systems for generating metadata pertaining to a captured RAW frame and embedding the generated metadata with an image frame generated from the captured RAW frame; and reconstruct a RAW frame using the generated metadata, embedded in the image frame, and the image frame, to efficiently enhance the image frame using the reconstructed RAW frame. By embedding the metadata during capture and reconstructing the RAW frame post capture, the RAW Bayer data (reconstructed RAW frame) can be used for improve the quality of the image frame using sophisticated image enhancement techniques. The reconstruction of a captured RAW frame from an image frame enables the application of Artificial Intelligence (AI) techniques for improving the quality of the image frame in terms of achieving exposure, improving dynamic range, obtaining lossless data, attaining flexibility for artefact correction (such as Moire, Noise, Haze, and so on), varying color tone and color temperature, varying one or parameters to create unique composition, and so on.

Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, the invention may be implemented on different hardware devices, e.g. using a plurality of Central Processing Units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the scope of the embodiments as described herein.

What is claimed is:

1. A method of processing a RAW frame by a device, the method comprising:

selecting, as an input frame, one of a captured RAW frame, a processed frame obtained by processing the captured RAW frame, and a scaled version of the captured RAW frame;

selecting at least one identified salient region in an output frame, wherein the output frame is constructed from the captured RAW frame, and the at least one identified salient region is selected based on at least one error between at least one region of the input frame and a reconstruction of the at least one region of the input frame from the at least one identified salient region of the output frame;

obtaining a plurality of reconstructed frames from a plurality of blocks of the at least one identified salient region, wherein the plurality of reconstructed frames correspond to a plurality of regions of the input frame; and generating metadata for reconstructing the RAW frame by encoding at least one of a plurality of errors between the plurality of reconstructed frames and the corresponding plurality of regions of the input frame, and a reconstruction technique used for obtaining the plurality of reconstructed frames.

2. The method of claim 1, wherein the processed frame is one of a first frame obtained by demosaicing the captured RAW frame, a second frame obtained by performing a white-balancing on the first frame, a third frame obtained by performing a color gamut mapping on the second frame, a fourth frame obtained by scaling the first frame based on parameters of a camera sensor of the device, a fifth frame obtained by scaling the second frame based on the parameters of the camera sensor of the device, or a sixth frame obtained by scaling the third frame based on the parameters of the camera sensor of the device.

3. The method of claim 1, wherein the selecting the input frame comprises:

computing a plurality of errors including a first error between the captured RAW frame and a reconstruction of the captured RAW frame from the output frame, a second error between the processed frame and a reconstruction of the processed frame from the output frame, and a third error between the captured RAW frame and a reconstruction of the captured RAW frame from a scaled output frame;

selecting the captured RAW frame as the input frame, based on the first error being the smallest among the plurality of errors;

selecting the processed frame as the input frame, based on the second error being the smallest among the plurality of errors; and selecting the scaled version of the captured RAW frame as the input frame, based on the third error being the smallest among the plurality of errors.

4. The method of claim 1, wherein the scaled version of the captured RAW frame is obtained by scaling the captured RAW frame based on one or more parameters of a camera sensor of the device, wherein the one or more parameters include a camera sensor size, Color Filter Array (CFA) of the camera sensor, and a color profile of the CFA.

5. The method of claim 1, wherein the selection of the at least one identified salient region comprises:
identifying a plurality of salient regions in the output frame;
reconstructing a plurality of regions from the plurality of salient regions in the output frame, wherein the reconstructed plurality of regions correspond to a plurality of regions in the input frame;
determining a plurality of errors between each of the reconstructed plurality of regions and the corresponding plurality of regions in the input frame; and
selecting the at least one identified salient region of the output frame from the plurality of salient regions in the output frame, wherein at least one error, from the plurality of errors, is greater than a predefined threshold.

6. The method of claim 1, wherein the reconstruction technique used for obtaining the plurality of reconstructed frames results in obtaining minimum values for the plurality of errors, between the plurality of reconstructed frames and the corresponding plurality of regions of the input frame, compared with values of the plurality of errors obtained by reconstructing the plurality of reconstructed frames, from the plurality of blocks of the at least one identified salient region, using a plurality of reconstruction techniques.

7. The method of claim 6, wherein the plurality of reconstruction techniques comprises at least one image processing based reconstruction technique and at least one image Convolutional Neural Network (CNN) based reconstruction technique.

8. The method of claim 1, further comprising:
reconstructing the input frame, using the reconstruction technique, based on the output frame and the generated metadata; and
generating the captured RAW frame from the reconstructed input frame, if the input frame is not the captured RAW frame.

9. A device comprising:
a memory storing instructions; and
at least one processor configured to execute the instructions to:
select, as an input frame, one of a captured RAW frame, a processed frame obtained by processing the captured RAW frame, and a scaled version of the captured RAW frame;
select at least one identified salient region in an output frame, wherein the output frame is constructed from the captured RAW frame and, the at least one identified salient region is selected based on at least one error between at least one region of the input frame and a reconstruction of the at least one region of the input frame from the at least one identified salient region of the output frame;
obtain a plurality of reconstructed frames from a plurality of blocks of the at least one identified salient region, wherein the plurality of reconstructed frames correspond to a plurality of regions of the input frame; and
generate metadata for reconstructing a RAW frame by encoding at least one of a plurality of errors between the plurality of reconstructed frames and the corresponding plurality of regions of the input frame, and a reconstruction technique used for obtaining the plurality of reconstructed frames.

10. The device of claim 9, wherein the processed frame is one of a first frame obtained by demosaicing the captured RAW frame, a second frame obtained by performing a white-balancing on the first frame, a third frame obtained by performing a color gamut mapping on the second frame, a fourth frame obtained by scaling the first frame based on parameters of a camera sensor of the device, a fifth frame obtained by scaling the second frame based on the parameters of the camera sensor of the device, or a sixth frame obtained by scaling the third frame based on the parameters of the camera sensor of the device.

11. The device of claim 9, wherein the at least one processor is further configured to execute the instructions to select the input frame by:
computing a plurality of errors including a first error between the captured RAW frame and a reconstruction of the captured RAW frame from the output frame, a second error between the processed frame and a reconstruction of the processed frame from the output frame, and a third error between the captured RAW frame and a reconstruction of the captured RAW frame from a scaled output frame;
selecting the captured RAW frame as the input frame, based on the first error being the smallest among the plurality of errors;
selecting the processed frame as the input frame, based on the second error being the smallest among the plurality of errors; and
selecting the scaled version of the captured RAW frame, as the input frame, based on the third error being the smallest among the plurality of errors.

12. The device of claim 9, wherein the at least one processor is further configured to execute the instructions to obtain the scaled version of the captured RAW frame by scaling the captured RAW frame based on one or more parameters of a camera sensor of the device, wherein the one or more parameters include a camera sensor size, Color Filter Array (CFA) of the camera sensor, and a color profile of the CFA.

13. The device of claim 9, wherein the at least one processor is further configured to execute the instructions to select the at least one identified salient region by:
identifying a plurality of salient regions in the output frame;
reconstructing a plurality of regions from the plurality of salient regions in the output frame, wherein the reconstructed plurality of regions correspond to a plurality of regions in the input frame;
determining a plurality of errors between each of the reconstructed plurality of regions and the corresponding plurality of regions in the input frame; and selecting the at least one identified salient region of the output frame from the plurality of salient regions in the output frame, wherein at least one error, from the plurality of errors, is greater than a predefined threshold.

14. The device of claim 9, wherein the reconstruction technique used for obtaining the plurality of reconstructed frames results in obtaining minimum values for the plurality of errors, between the plurality of reconstructed frames and the corresponding plurality of regions of the input frame, compared with values of the plurality of errors obtained by reconstructing the plurality of reconstructed frames, from the plurality of blocks of the at least one identified salient region, using a plurality of reconstruction techniques.

15. The device of claim 14, wherein the plurality of reconstruction techniques comprises at least one image processing based reconstruction technique and at least one image Convolutional Neural Network (CNN) based reconstruction technique.

16. A non-transitory computer readable medium having instructions stored therein, which when executed by at least one processor of a device, cause the device to perform a method of processing a RAW frame, the method comprising:
   selecting, as an input frame, one of a captured RAW frame, a processed frame obtained by processing the captured RAW frame, and a scaled version of the captured RAW frame;
   selecting at least one identified salient region in an output frame, wherein the output frame is constructed from the captured RAW frame, and the at least one identified salient region is selected based on at least one error between at least one region of the input frame and a reconstruction of the at least one region of the input frame from the at least one identified salient region of the output frame;
   obtaining a plurality of reconstructed frames from a plurality of blocks of the at least one identified salient region, wherein the plurality of reconstructed frames correspond to a plurality of regions of the input frame; and
   generating metadata for reconstructing the RAW frame by encoding at least one of a plurality of errors between the plurality of reconstructed frames and the corresponding plurality of regions of the input frame, and a reconstruction technique used for obtaining the plurality of reconstructed frames.

17. The non-transitory computer readable medium of claim 16, wherein the selecting the input frame comprises:
   computing a plurality of errors including a first error between the captured RAW frame and a reconstruction of the captured RAW frame from the output frame, a second error between the processed frame and a reconstruction of the processed frame from the output frame, and a third error between the captured RAW frame and a reconstruction of the captured RAW frame from a scaled output frame;
   selecting the captured RAW frame as the input frame, based on the first error being the smallest among the plurality of errors;
   selecting the processed frame as the input frame, based on the second error being the smallest among the plurality of errors; and
   selecting the scaled version of the captured RAW frame, as the input frame, based on the third error being the smallest among the plurality of errors.

18. The non-transitory computer readable medium of claim 16, wherein the selection of the at least one identified salient region comprises:
   identifying a plurality of salient regions in the output frame;
   reconstructing a plurality of regions from the plurality of salient regions in the output frame, wherein the reconstructed plurality of regions correspond to a plurality of regions in the input frame;
   determining a plurality of errors between each of the reconstructed plurality of regions and the corresponding plurality of regions in the input frame; and
   selecting the at least one identified salient region of the output frame from the plurality of salient regions in the output frame, wherein at least one error, from the plurality of errors, is greater than a predefined threshold.

19. The non-transitory computer readable medium of claim 16, wherein the reconstruction technique used for obtaining the plurality of reconstructed frames results in obtaining minimum values for the plurality of errors, between the plurality of reconstructed frames and the corresponding plurality of regions of the input frame, compared with values of the plurality of errors obtained by reconstructing the plurality of reconstructed frames, from the plurality of blocks of the at least one identified salient region, using a plurality of reconstruction techniques.

20. The non-transitory computer readable medium of claim 16, wherein the method further comprises:
   reconstructing the input frame, using the reconstruction technique, based on the output frame and the generated metadata; and
   generating the captured RAW frame from the reconstructed input frame, if the input frame is not the captured RAW frame.

* * * * *